(12) United States Patent
Alli et al.

(10) Patent No.: US 8,714,738 B2
(45) Date of Patent: May 6, 2014

(54) PROCESS FOR MAKING OPHTHALMIC LENSES

(71) Applicant: Johnson & Johnson Vision Care, Inc., Jacksonville, FL (US)

(72) Inventors: Azaam Alli, Jacksonville, FL (US); Diana Zanini, Jacksonville (CA); James D. Ford, Orange Park, FL (US); Shivkumar Mahadevan, Orange Park, FL (US); Kristy L. Canavan, Jacksonville, FL (US); David C. Turner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/783,666

(22) Filed: Mar. 4, 2013

(65) Prior Publication Data
US 2013/0175722 A1 Jul. 11, 2013

Related U.S. Application Data

(62) Division of application No. 11/387,250, filed on Mar. 23, 2006, now Pat. No. 8,414,804.

(51) Int. Cl.
*G02C 7/04* (2006.01)
(52) U.S. Cl.
USPC ............. 351/159.02; 351/159.73; 351/159.78
(58) Field of Classification Search
USPC ........................... 351/159.02, 159.73, 159.78
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 4,113,224 A | 9/1978 | Clark | |
| 4,120,570 A | 10/1978 | Gaylord | |
| 4,136,250 A | 1/1979 | Mueller | |
| 4,153,641 A | 5/1979 | Deichert | |
| 4,197,266 A | 4/1980 | Clark | |
| 4,303,772 A | 12/1981 | Novicky | |
| 4,495,313 A | 1/1985 | Larsen | |
| 4,546,123 A | 10/1985 | Schafer | |
| 4,680,336 A | 7/1987 | Larsen | |
| 4,740,533 A | 4/1988 | Su | |
| 4,889,664 A | 12/1989 | Kindt-Larsen | |
| 4,910,277 A | 3/1990 | Bambury | |
| 5,006,622 A | 4/1991 | Kunzler | |
| 5,034,461 A | 7/1991 | Lai | |
| 5,039,459 A | 8/1991 | Kindt Larsen | |
| 5,070,215 A | 12/1991 | Bambury | |
| 5,256,751 A | 10/1993 | Vanderlaan | |
| 5,311,223 A | 5/1994 | Vanderlaan | |
| 5,321,108 A | 6/1994 | Kunzler | |
| 5,387,662 A | 2/1995 | Kunzler | |
| 5,539,016 A | 7/1996 | Kunzler | |
| 5,820,895 A | 10/1998 | Widman | |
| 5,944,853 A | 8/1999 | Molock | |
| 5,998,498 A | 12/1999 | Vanderlaan | |
| 6,020,445 A | 2/2000 | Vanderlaan | |
| 6,071,112 A | 6/2000 | Calvin | |
| 6,367,929 B1 | 4/2002 | Maiden | |
| 6,765,083 B2 | 7/2004 | Ford | |
| 6,939,487 B1 | 9/2005 | Ajello | |
| 8,158,695 B2 | 4/2012 | Vanderlaan | |
| 2002/0016383 A1 | 2/2002 | Iwata | |
| 2003/0052424 A1 | 3/2003 | Turner | |
| 2003/0125498 A1 | 7/2003 | McCabe | |
| 2003/0162862 A1 | 8/2003 | McCabe | |
| 2004/0002556 A1 | 1/2004 | Molock | |
| 2004/0091613 A1 | 5/2004 | Wood | |
| 2005/0054546 A1 | 3/2005 | Glick | |
| 2005/0176911 A1 | 8/2005 | Zanini | |
| 2005/0179862 A1 | 8/2005 | Steffen | |
| 2006/0072069 A1 | 4/2006 | Laredo | |
| 2006/0202368 A1 | 9/2006 | Matsuzawa | |
| 2007/0132119 A1 | 6/2007 | Rastogi | |

FOREIGN PATENT DOCUMENTS

| | | |
|---|---|---|
| EP | 80539 B1 | 6/1983 |
| EP | 1693688 A1 | 8/2006 |
| JP | 2007527448 A | 9/2007 |
| JP | 2008500137 A | 1/2008 |
| RU | 2017470 C1 | 8/1990 |
| WO | WO 9631792 A1 | 10/1996 |
| WO | WO 03022321 A2 | 3/2003 |
| WO | WO 03022322 A2 | 3/2003 |
| WO | WO 2005005517 A2 | 1/2005 |
| WO | WO 2005113028 A1 | 12/2005 |
| WO | WO 2006039276 | 4/2006 |
| WO | WO 2006094771 A1 | 9/2006 |
| WO | WO 2007111973 A2 | 10/2007 |
| WO | WO 2007111978 A2 | 10/2007 |

OTHER PUBLICATIONS

Volume III, Photoinitiators for Free Radical Cationic & Anionic Photopolymerization, 2$^{nd}$ Edition by J.V. Crivello & K. Dietliker; edited by G. Bradley; John Wiley and Sons; New York; 1998.
PCT International Search Report, dated May 3, 2010, for PCT Int'l Appln. No. PCT/US2007/014771.
PCT International preliminary Report on Patentability dated May 14, 2010 for PCT/US2007/014771.

*Primary Examiner* — Scott J Sugarman
(74) *Attorney, Agent, or Firm* — Karen A. Harding

(57) ABSTRACT

The present invention relates to aqueous processes for the production of silicone hydrogel contact lenses.

45 Claims, No Drawings

PROCESS FOR MAKING OPHTHALMIC LENSES

RELATED APPLICATIONS

This application is a division of application Ser. No. 11/387,250 filed Mar. 23, 2006.

FIELD OF THE INVENTION

This invention relates to aqueous processes for making silicone hydrogel contact lenses that do not cause ocular discomfort.

BACKGROUND OF THE INVENTION

It is well known that contact lenses can be used to improve vision. Various contact lenses have been commercially produced for many years. Hydrogel contact lenses are very popular today. These lenses are often more comfortable to wear than contact lenses made of hard materials. Malleable soft contact lenses can be manufactured by forming a lens in a multi-part mold where the combined parts form a topography consistent with the desired final lens. Contact lenses made from silicone hydrogels have been disclosed. However, many of the raw materials which are used to make silicone hydrogel contact lenses have impurities which cannot be efficiently removed using the conventional water and saline based leaching steps.

Some early disclosed methods used only water. However, these early processes used extremely long water leaching and/or high temperatures to extract undesirable components. No clinical data on the resulting lenses is available to confirm removal of undesirable impurities.

Processes for removing undesired impurities from silicone hydrogel lenses via leaching steps using alcohols have been disclosed. The alcohols can sting the eye and must be completely removed from the contact lens. Special handling steps must be taken to dispose of the alcohols making the manufacturing process more expensive. Moreover, the use of organic solutions can present drawbacks, including, for example: safety hazards; increased risk of down time to a manufacturing line; high cost of release solution; and the health hazards associated with organic solvents.

While modifying the leaching process is possible, it would be desirable to find silicone hydrogel materials which are free of impurities which cause undesirable ocular reactions, such as stinging.

SUMMARY OF THE INVENTION

The present invention relates to a process comprising
(a) curing in a mold a reaction mixture comprising at least one silicone containing component wherein said reaction mixture is substantially free from sparingly water soluble components or impurities having a retention time, relative to TRIS of less than about 0.9 to form a lens;
(b) contacting said lens and mold with an aqueous solution at a temperature less than 99° C. for less than about 1 hour; to release said lens from the mold and
(c) optionally post processing the lens, wherein said post processing, if conducted, is conducted with aqueous solutions for a time less than 6 hours.

DETAILED DESCRIPTION OF THE INVENTION

It has been found that silicone hydrogels can be made via an aqueous hydration process so long as certain impurities are kept below an amount which causes ocular discomfort. Specifically, it has been found that compounds in silicone hydrogel contact lenses which can cause ocular discomfort are sparingly soluble in water, but have sufficient mobility in tears or tear components to move from the lens into ocular tissue. Compounds and impurities which are sparingly soluble in water and are able to move directly to the ocular tissue when in direct contact with ocular tissue may also contribute to ocular discomfort. As used herein "sparingly water soluble" means that less than about 2000 ppm of the compound is soluble in water at 25° C. These components and impurities are hereinafter referred to as "sparingly water soluble" or "SWS" components and impurities. When present as leachable compounds, these SWS compounds are not completely removed using aqueous solutions in the extraction and hydration steps of the contact lens manufacturing process. However, SWS compounds may leach from the contact lens during wear, causing ocular discomfort to the wearer. Thus it is imperative to insure that no SWS compounds and impurities remain in the contact lens.

Unfortunately attempts to identify all of the chemical moieties which cause ocular discomfort have been unsuccessful. However, applicants have found that the SWS compounds and impurities may be characterized using liquid chromatography as described herein, and have a retention time relative to 3-methacryloxypropyltris(trimethylsiloxy)silane ("TRIS"), measured in an HPLC using mixtures of acetonitrile, water, isopropanol and formate buffer as the solvent, of less than about 0.9. Thus, applicants have found that silicone hydrogel contact lenses may be made using aqueous processing so long as sparingly water soluble compounds or impurities having relative retention times of less than about 0.9 are substantially excluded from the reactive mixture or are bound to the lens polymer during curing.

As used herein retention time means the time from injection of the sample into an HPLC to the time of the peak of elution. The retention times used in the present invention are relative retention times measured against 3-methacryloxypropyltris(trimethylsilxoy)silane ("TRIS") using the same conditions, column and equipment for both TRIS and the sample to be measured. The use of a relative retention time instead of an absolute retention time allows for more consistent retention time values regardless of the specific HPLC system selected.

In the examples, the Applicants used an Agilent 1100 HPLC with a Thermo ODS Hypersil column of dimensions 150×4.6 mm×5μ, with attached Finnigan LCQ Classic mass spectrometer with electrospray ionization in tandem with UV and ELSD (Sedex). While applicants have used the specifically disclosed equipment, any C18 column and equivalent equipment will provide results consistent with those claimed herein. The solvent gradient profile specified in Table 6 should be used to determine the relative retention times specified herein. The chromatographic analysis is performed at about 25° C.

Other chromatographic conditions are well known in the art, and will not affect the results of this test, so long as they are within the conditions commonly used in the art, such as but not limited to tubing volumes.

Samples are prepared by making 2% (wt/wt) solutions of each test material in isopropyl alcohol. 3 μL of sample solution is injected into the HPLC, using a flow rate of 1 ml/minute. The eluting solvent for each sample was varied using the gradient program shown in Table 6 of the Examples.

The contact lenses of the present invention are formed by combining the desired lens forming components into a reactive mixture. The reactive mixture comprises the reactive components, initiators, and other desired components described below. The reactive mixture used to form contact lenses is substantially free from SWS components and impurities having a retention time, relative to TRIS of less than about 0.9 and in another embodiments less than about 0.8.

As used herein "substantially free from SWS compounds and impurities" means the lens has a concentration of SWS compounds and impurities insufficient to cause ocular discomfort. Ocular discomfort may be measured by putting contact lenses on the eyes of at least 10 patients, and collecting subjective information at initial insertion and after 30 minutes of wear. As used herein ocular discomfort is a score of less than about 20%, preferably less than about 10% and preferably less than about 5% of the subjects noting discomfort at 30 minutes of wear.

As used herein, "ocular discomfort" means a subjective rating of at least moderate stinging or burning within 30 minutes of insertion of the contact lens on the eye.

In one embodiment the reactive mixture comprises SWS compounds and impurities having a retention time, relative to TRIS specified herein in an amount of less than about 3000, in another embodiment less than about 1000 ppm, in another embodiment less than about 200 ppm, and in another embodiment less than about 100 ppm.

In another embodiment the amount in the reactive mixture of SWS compounds and impurities having the retention time, relative to TRIS specified herein is not controlled, but the curing conditions are selected to produce a cured contact lens having less than an ocular discomfort causing amount of said component or impurity. In one embodiment the less than an ocular discomfort causing amount of said component or impurity comprises an amount less than about 2000 ppm based upon the weight of the lens in a fully hydrated state.

The reactive mixtures comprise at least one silicone containing component.

The term components includes monomers, macromers and prepolymers. "Monomer" refers to lower molecular weight compounds that can be polymerized to higher molecular weight compounds, polymers, macromers, or prepolymers. The term "macromer" as used herein refers to a high molecular weight polymerizable compound. Prepolymers are partially polymerized monomers or monomers which are capable of further polymerization.

A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. These references disclose many examples of olefinic silicone-containing components.

While almost any silicone containing component may be included, in order to provide the lenses of the present invention with the desired modulus, the majority of the mass fraction of the silicone components used in the lens formulation should contain only one polymerizable functional group ("monofunctional silicone containing component"). In silicone containing lenses, to insure the desired balance of oxygen transmissibility and modulus it is preferred that all components having more than one polymerizable functional groups ("multifunctional components") make up no more than 10 mmol/100 g of the reactive components, and preferably no more than 7 mmol/100 g of the reactive components. Suitable monofunctional silicone containing components include polysiloxanylalkyl(meth)acrylic monomers of Formula I:

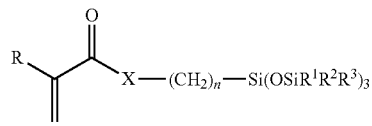

wherein: R denotes H or lower alkyl; X denotes O or $NR^4$; each $R^4$ independently denotes hydrogen or methyl,
each $R^1$-$R^3$ independently denotes a lower alkyl radical or a phenyl radical, and
n is 1 or 3 to 10.

Mono-functional polydimethylsiloxanes (mPDMS) may also be used. Suitable mPDMS compounds include Structure II:

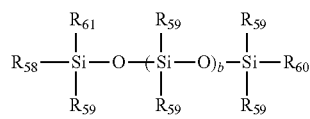

where b=0 to 100, where it is understood that b is a distribution having a mode equal to a stated value, preferably 2 to 16, more preferably 3 to 10; $R_{58}$ is a monovalent group containing at least one ethylenically unsaturated moiety, preferably a monovalent group containing a styryl, vinyl, or methacrylate moiety, more preferably a methacrylate moiety; each $R_{59}$ is independently a monovalent alkyl, or aryl group, which may be further substituted with alcohol, amine, ketone, carboxylic acid or ether groups, preferably unsubstituted monovalent alkyl or aryl groups, more preferably methyl; $R_{60}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$ alkyl groups, most preferably butyl; and $R_{61}$ is independently alkyl or aromatic, preferably ethyl, methyl, benzyl, phenyl, or a monovalent siloxane chain comprising from 1 to 100 repeating Si—O units. Examples of suitable mPDMS compounds include 3-methacryloxy-2-hydroxypropyloxy)propylbis(trimethylsiloxy)methylsilane, monomethacryloxypropyl terminated mono-n-butyl terminated polydimethylsiloxane, methacryloxypropylpentamethyl disiloxane, combinations thereof and the like.

Examples of polysiloxanylalkyl(meth)acrylic monomers include methacryloxypropyl tris(trimethylsiloxy)silane, pentamethyldisiloxanyl methylmethacrylate, and methyldi(trimethylsiloxy)methacryloxymethyl silane. Methacryloxypropyl tris(trimethylsiloxy)silane is the most preferred.

In some embodiments monofunctional polydimethylsiloxanes may be preferred, as they lower not only modulus, but also tan δ, while bulky silicones, such as those containing at least one branching trimethylsiloxy group will increase tan δ. Accordingly, at least about 30 and preferably at least about 60 weight % of all the silicone components should be non-bulky silicone containing compounds such as polydimethylsiloxanes.

In one embodiment, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In addition to the monofunctional silicone containing components, multifunctional silicone containing components and/or bulky silicone containing compounds may also be included in amounts which do not impart an undesirably high modulus and/or tan δ.

One class of silicone-containing components is a poly(organosiloxane) prepolymer represented by formula III:

Formula III

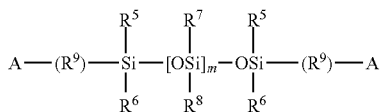

wherein each A independently denotes an activated unsaturated group, such as an ester or amide of an acrylic or a methacrylic acid or an alkyl or aryl group (providing that at least one A comprises an activated unsaturated group capable of undergoing radical polymerization); each of $R^5$, $R^6$, $R^7$ and $R^8$ are independently selected from the group consisting of a monovalent hydrocarbon radical or a halogen substituted monovalent hydrocarbon radical having 1 to 18 carbon atoms which may have ether linkages between carbon atoms;

$R^9$ denotes a divalent hydrocarbon radical having from 1 to 22 carbon atoms, and m is 0 or an integer greater than or equal to 1, and preferable 5 to 400, and more preferably 10 to 300. One specific example is α,ω-bismethacryloxypropyl polydimethylsiloxane.

Another useful class of silicone containing components includes silicone containing vinyl carbonate or vinyl carbamate monomers of the following formula:

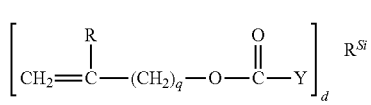 Formula III wherein: Y denotes O, S or NH; $R^{Si}$ denotes a silicone-containing organic radical; R denotes hydrogen or methyl; d is 1, 2, 3 or 4; and q is 0 or 1. Suitable silicone-containing organic radicals $R^{Si}$ include the following:

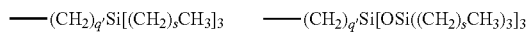

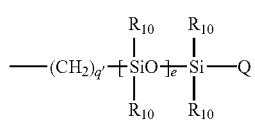

wherein:
Q denotes

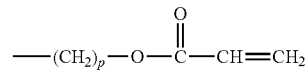

Wherein p is 1 to 6; $R^{10}$ denotes an alkyl radical or a fluoroalkyl radical having 1 to 6 carbon atoms; e is 0 to 200; q' is 1, 2, 3 or 4; and s is 0, 1, 2, 3, 4 or 5.

The silicone-containing vinyl carbonate or vinyl carbamate monomers specifically include: 1,3-bis[4-(vinyloxycarbonyloxy)but-1-yl]tetramethyldisiloxane; 3-(vinyloxycarbonylthio) propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

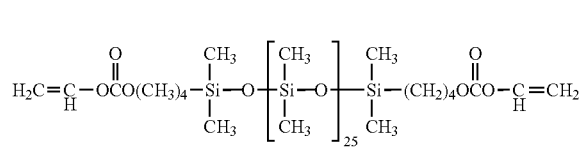

Another class of silicone-containing components includes polyurethane macromers of the following formulae:

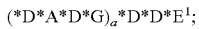

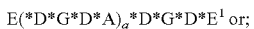

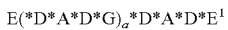 Formulae IV-VI wherein:
D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$_a$ is at least 1;

A denotes a divalent polymeric radical of formula:

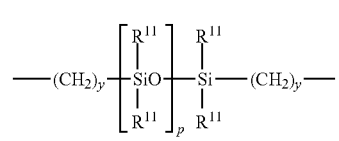 Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

Formula VIII

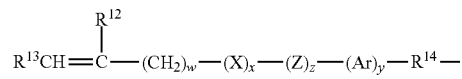

wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

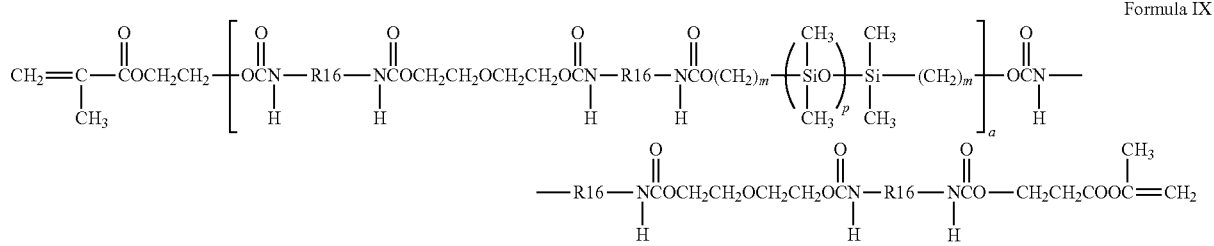

Formula IX wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

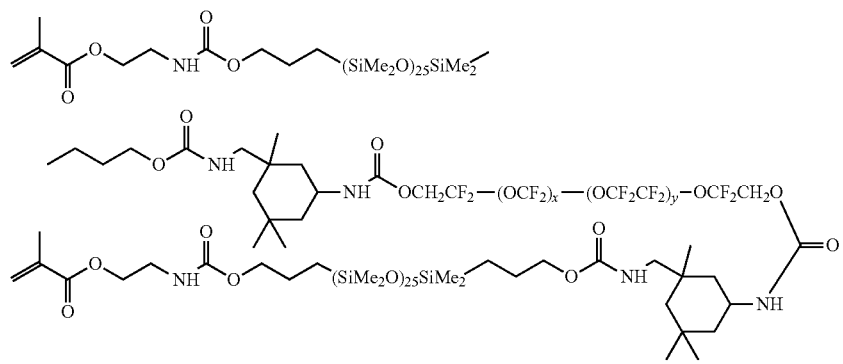

Other silicone containing components suitable for use in this invention include those described is WO 96/31792 such as macromers containing polysiloxane, polyalkylene ether, diisocyanate, polyfluorinated hydrocarbon, polyfluorinated ether and polysaccharide groups. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkages and crosslinkable monomers containing polyether and polysiloxanyl groups. Any of the foregoing polysiloxanes can also be used as the silicone containing component in this invention.

The reactive mixture may also comprise at least one hydrophilic component. Hydrophilic monomers can be any of the hydrophilic monomers known to be useful to make hydrogels.

One class of suitable hydrophilic monomers include acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus. The term "vinyl-type" or "vinyl-containing" monomers refer to monomers containing the vinyl grouping (—CH=CH$_2$) and are generally highly reactive. Such hydrophilic vinyl-containing monomers are known to polymerize relatively easily.

"Acrylic-type" or "acrylic-containing" monomers are those monomers containing the acrylic group: (CH$_2$=CRCOX) wherein R is H or CH$_3$, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Hydrophilic vinyl-containing monomers which may be incorporated into the silicone hydrogels of the present invention include monomers such as N-vinyl amides, N-vinyl lactams (e.g. NVP), N-vinyl-N-methyl acetamide, N-vinyl-N-ethyl acetamide, N-vinyl-N-ethyl formamide, N-vinyl formamide, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

In one embodiment the hydrophilic comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, methacrylic acid and acrylic acid with DMA being the most preferred.

The hydrophilic monomers may be present in a wide range of amounts, depending upon the specific balance of properties desired. Amounts of hydrophilic monomer up to about 50 and preferably between about 5 and about 50 weight %, based upon all components in the reactive components are acceptable. For example, in one embodiment lenses of the present invention comprise a water content of at least about 25%, and in another embodiment between about 30 and about 70%. For these embodiments, the hydrophilic monomer may be included in amounts between about 20 and about 50 weight %.

Other components that can be present in the reaction mixture used to form the contact lenses of this invention include wetting agents, such as those disclosed in U.S. Pat. No. 6,367,929, WO03/22321, WO03/22322, compatibilizing components, such as those disclosed in US2003/162,862 and US2003/125,498, ultra-violet absorbing compounds, medicinal agents, antimicrobial compounds, copolymerizable and nonpolymerizable dyes, release agents, reactive tints, pigments, combinations thereof and the like.

A polymerization catalyst may be included in the reaction mixture. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and in another embodiment the method of polymerization initiation is via visible light activation. A preferred initiator is bis(2,4,6-trimethylbenzoyl)-phenyl phosphine oxide (Irgacure 819®).

The reactive components (silicone containing component, hydrophilic monomers, lubricious polymers, and other components which are reacted to form the lens) are mixed together either with or without a diluent to form the reaction mixture.

In one embodiment a diluent is used having a polarity sufficiently low to solubilize the non-polar components in the reactive mixture at reaction conditions. One way to characterize the polarity of the diluents of the present invention is via the Hansen solubility parameter, $\delta p$. In certain embodiments, the $\delta p$ is less than about 10, and preferably less than about 6. Suitable diluents are further disclosed in U.S. Ser. No. 10/794,399 and U.S. Pat. No. 6,020,445.

Classes of suitable diluents include, without limitation, alcohols having 2 to 20 carbons, amides having 10 to 20 carbon atoms derived from primary amines, ethers, polyethers, ketones having 3 to 10 carbon atoms, and carboxylic acids having 8 to 20 carbon atoms. For all solvents, as the number of carbons increase, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

Preferred diluents include diluents that have some degree of solubility in water. In some embodiments at least five percent of the diluent is miscible water. Examples of water soluble diluents include 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like.

The reactive mixture of the present invention may be cured via any known process for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to thereby produce a polymer in the approximate shape of the final desired product.

After curing the lens is treated to remove unreacted components and release the lens from the lens mold.

As used herein, the term "treat" means to expose a cured lens to an aqueous solution, but excludes equilibration, sterilization and storage of the lens. Aqueous solutions are solutions which primarily comprise water. In one embodiment the aqueous solutions of the present invention comprise at least about 70% water and in others at least about 90 weight % water. Aqueous solutions may also include additional water soluble components such as release agents, wetting agents, slip agents, pharmaceutical and nutraceutical components, combinations thereof and the like. Release agents are compounds or mixtures of compounds which, when combined with water, decrease the time required to release a contact lens from a mold, as compared to the time required to release such a lens using an aqueous solution that does not comprise the release agent. In one embodiment the aqueous solutions comprise less than about 10 weight %, and in others less than about 5 weight % organic solvents such as isopropyl alcohol, and in another embodiment are free from organic solvents. In these embodiments the aqueous solutions do not require special handling, such as purification, recycling or special disposal procedures.

In various embodiments, treatment can be accomplished, for example, via immersion of the lens in an aqueous solution or exposing the lens to a flow of an aqueous solution. In various embodiments, treatment can also include, for example, one or more of: heating the aqueous solution; stirring the aqueous solution; increasing the level of release aid in the aqueous solution to a level sufficient to cause release of the lens; mechanical agitation of the lens; and incorporating at least one leach aid in the aqueous solution to a level sufficient to facilitate adequate removal of unreacted components from the lens.

Treatment may be conducted by various implementations, such as but not limited to a batch process wherein lenses are submerged in a solution contained in a fixed tank for a specified period of time or in a vertical process where lenses are exposed to a continuous flow of an aqueous solution.

In some embodiments the aqueous solution can be heated with a heat exchanger or other heating apparatus to further facilitate leaching of the lens and release of the lens from a mold part. For example, heating can include raising the temperature of an aqueous solution to the boiling point while a hydrogel lens and mold part to which the lens is adhered are submerged in the heated aqueous solution. Other embodiments can include controlled cycling of the temperature of the aqueous solution.

Some embodiments can also include the application of physical agitation to facilitate leach and release. For example, the lens mold part to which a lens is adhered, can be vibrated or caused to move back and forth within an aqueous solution. Other embodiments may include ultrasonic waves through the aqueous solution.

These and other similar processes can provide an acceptable means of releasing the lens.

As used herein, "released from a mold" means that a lens is either completely separated from the mold, or is only loosely attached so that it can be removed with mild agitation or pushed off with a swab. In the process of the present invention the conditions used include temperature less than 99° C. for less than about 1 hour.

The lenses of the present invention require minimal treatment. The treatment is conducted with aqueous solutions for times less than about 6 hours, in some embodiments less than about 4 hours, less than about 2 hours and sometimes less than about 1 hour.

The lenses of the present invention require minimal post treatment. Post treatment is an optional part of treatment and includes solution exchange and extraction but not sterilization, storage and equilibration. In embodiments where post treatment is included, the post treatment is conducted with aqueous solutions for times less than about 6 hours, in some embodiments less than about 4 hours, less than about 2 hours and sometimes less than about 1 hour.

The treated lenses may be sterilized by known means such as, but not limited to autoclaving.

It will be appreciated that all of the tests specified herein have a certain amount of inherent test error. Accordingly, results reported herein are not to be taken as absolute numbers, but numerical ranges based upon the precision of the particular test.

In order to illustrate the invention the following examples are included. These examples do not limit the invention. They are meant only to suggest a method of practicing the invention. Those knowledgeable in contact lenses as well as other specialties may find other methods of practicing the invention. However, those methods are deemed to be within the scope of this invention.

EXAMPLES

The following abbreviations are used in the examples below:

SiGMA 2-propenoic acid, 2-methyl-,2-hydroxy-3-[3-[1,3,3,3-tetramethyl-1-[(trimethylsilyl)oxy]disiloxanyl]propoxy]propyl ester SiNAA N-(2-hydroxy-3-(3-(bis(trimethylsilyloxy)methylsilyl)propyloxy)propyl)-2-methyl acrylamide DMA N,N-dimethylacrylamide HEMA 2-hydroxyethyl methacrylate mPDMS 800-1000 MW ($M_n$) monomethacryloxypropyl terminated mono-n-butyl terminated polydimethylsiloxane Norbloc 2-(2'-hydroxy-5-methacrylyloxyethylphenyl)-2H-benzotriazole CGI 1850 1:1 (wgt) blend of 1-hydroxycyclohexyl phenyl ketone and bis(2,6-dimethoxybenzoyl)-2,4-4-trimethylpentyl phosphine oxide PVP poly(N-vinyl pyrrolidone) (K values noted)

Blue HEMA the reaction product of Reactive Blue 4 and HEMA, as described in Example 4 of U.S. Pat. No. 5,944,853

IPA isopropyl alcohol

D3O 3,7-dimethyl-3-octanol mPDMS-OH mono-(3-methacryloxy-2-hydroxypropyloxy) propyl terminated, mono-butyl terminated polydimethylsiloxane TEGDMA tetraethyleneglycol dimethacrylate TrEGDMA triethyleneglycol dimethacrylate TRIS 3-methacryloxypropyltris(trimethylsiloxy)silane acPDMS bis-3-acryloxy-2-hydroxypropyloxypropyl polydimethylsiloxane (MW 1000 and 2000, acrylated polydimethylsiloxane) from Gelest and Degussa, respectively maPDMS methacryloxypropyl terminated polydimethylsiloxane (MW 550-700) from Gelest CGI 819 bis(2,4,6-trimethylbenzoyl)-phenylphosphineoxide M2D10 1000-1100 MW ($M_n$) monomethacryloxybutyl terminated mono-n-butyl terminated polydimethylsiloxane OH-TRIS 3-methacryloxy-2-hydroxypropyltris(trimethylsiloxy)silane SiNAA dimer N,N-bis[2-hydroxy-3-(3-(bis(trimethylsilyloxy)methylsilyl)propyloxy)propyl]-2-methyl acrylamide Throughout the Examples intensity is measured using an IL 1400A radiometer, using an XRL 140A sensor.

Examples 1-5

The reaction components and diluent (t-amyl alcohol) listed in Table 2 were mixed together with stirring or rolling for at least about 3 hours at about 23° C., until all components were dissolved. The reactive components are reported as weight percent of all reactive components and the diluent is weight percent of final reaction mixture. The reaction mixture was placed into thermoplastic contact lens molds (front-curves made from Zeonor® obtained from Zeon, Corp. and back curves made from polypropylene) and irradiated using Philips TL 20W/03T fluorescent bulbs at 45° C. for about 15 minutes in $N_2$. The molds were opened and lenses were released in $H_2O$ at 95° C. for twenty minutes, then hydrated in water at 70° C. for about 3.5 hours, then placed in packing solution for about 30 minutes at ambient temperature. The lenses were packaged in borate buffered saline solution in glass vials and sterilized for 20 minutes at 121° C.

Leachables were measured as follows

Sample Preparation—Lens Extraction

Using a lens swab, hydrated lenses were placed on blotting paper and then blotted with a second piece of blotting paper to remove any excess water from the lens surface. For each leachable component tested, ten lenses were weighed into a tared scintillation vial and the weight was recorded. 5 mLs of solvent listed in Table 1 was added to the lens vial and the mixture was sonicated for a period of 1 hour.

TABLE 1

| Leachable | Solvent |
|---|---|
| SiGMA | Methanol |
| SiGMA Epoxide | decane/ACN (0.050 g decane/1 L ACN) solution |
| BHT | IPA |

Sample Preparation—Lens Extraction for SiGMA Glycol

The lenses were prepared as above, except the lenses were briefly rinsed in DI water, and dried overnight both at room temperature. 5 mLs of acetonitrile ($CH_3CN$, ACN) was added to the lens vial and the mixture was sonicated for a period of 1 hour. 500 μL of the supernatant, 50 μL of a dodecane/ACN (0.05 g dodecane/100 mL ACN) solution, and 100 μL of Regisil RC-2 reagent (N,O-bis(trimethylsilyl)trifluoroacetamide with 1% trichlorosilane) were added to the GC vial.

Leachable SiGMA Analysis

Leachable SiGMA analysis was performed via C18 RP-HPLC with UV detection. A Phenomenex ODS-3 column of dimensions 150 mm×4.5 mm was used. The mobile phase employed was 20/80 water (99.95% with 0.05% $H_3PO_4$)/ACN (99.95% with 0.05% $H_3PO_4$) for a period of 17 minutes using a flow of 1 mL/min. The injection volume was 50 μL. SiMAA2 was detected using a UV absorbance detector at 210 nm. Results are shown in Table 3, below.

Leachable SiGMA Glycol Analysis

Leachable SiGMA glycol analysis was performed via GC/FID. A Restek RTX-5 column of dimensions 30 m×0.25 mm with a film thickness of 0.5 μm. The carrier gas used helium at 100° C. with 2 min hold. The oven ramp conditions included 8° C./min to 325° C., followed by a 5 min hold. The injection and detection temperatures were 250° C. and 280° C., respectively. The oxidizer and fuel flow were 440 mL/min and 40 m/min, respectively. Make up was 20 mL/min. The injection volume was 1 μL. Results are shown in Table 3, below.

Leachable SiGMA Epoxide Analysis

Leachable SiGMA epoxide analysis was performed via GC/FID. A DB-5 column of dimensions 30 m×0.25 mm with a film thickness of 0.5 μm. The carrier gas used helium at 50° C. with 5 min hold. The oven ramp conditions included 25° C./min to 175° C., followed by a hold for 6 min, followed by 25° C./min to 325° C., followed by a 5 min hold. The injection and detection temperatures were 220° C. and 280° C., respectively. The injection volume was 1 μL. Results are shown in Table 3, below.

Leachable BHT Analysis

Leachable BHT analysis was performed via HPLC with UV detection. A Zorbax Eclipse column of dimensions 75 mm×4.6 mm with a mean particle size of 3.5 μm was used. The mobile phase employed was a linear gradient of 30/70 water (99.95% with 0.05% $H_3PO_4$)/ACN (99.95% with 0.05% $H_3PO_4$) to 100% IPA over a period of 20.10 minutes using a flow of 1 mL/min. The injection volume was 50 μL. BHT was detected using a UV absorbance detector at 210 nm. Results are shown in Table 3, below.

The lenses made in Examples 1 through 5 were evaluated clinically on human eyes. Initially lenses from each example were fit on five subjects in a randomized, bilateral study. The lenses were worn for a 30 minute (maximum) open eye period. If the initial 5 subjects reported equivalent physiological performance of the test lenses compared to the control lens, an additional 10 subjects were evaluated (a maximum of 15 patients for 30 minutes of exposure). If the initial study subjects reported ocular discomfort with the test lens, no additional subject were enrolled. The percentage of patients reporting ocular discomfort is listed below in Table 3.

TABLE 2

Components of Formulations

| Components: | Ex. 1 | Ex. 2 | Ex. 3 | Ex. 4 | Ex. 5 |
|---|---|---|---|---|---|
| SiGMA | 30.00 | N/A | N/A | N/A | N/A |
| SiNAA | N/A | 30.00 | N/A | N/A | N/A |
| mPDMS 1000 | N/A | 22.00 | N/A | 20.00 | 20.00 |
| DMA | 20.00 | 31.00 | 31.00 | 31.00 | 31.00 |
| HEMA | 42.00 | 8.50 | 52.75 | 32.75 | 31.23 |
| EGDMA | 0.75 | 0.75 | N/A | N/A | N/A |
| Norbloc | N/A | 1.50 | N/A | N/A | 1.50 |
| Blue HEMA | N/A | 0.02 | N/A | N/A | 0.02 |
| PVP K90 | 7.00 | 6.00 | 6.00 | 6.00 | 6.00 |
| CGI 819 | 0.25 | 0.23 | 0.25 | 0.25 | 0.25 |
| maPDMS 550-700 | N/A | N/A | 10.00 | 10.00 | 10.00 |
| Total Monomer | 60% | 60% | 60% | 60% | 60% |
| PVP K12 | 11 | 11 | N/A | N/A | N/A |
| t-Amyl Alcohol | 29 | 29 | 40 | 40 | 100 |
| Total Diluent | 40% | 40% | 40% | 40% | 40% |

TABLE 3

Leachable Levels of Components of Formulations (ppm)

| Components | Reporting Limits | Ex. 1 | Ex. 2 | Ex. 3 | Ex. 4 | Ex. 5 |
|---|---|---|---|---|---|---|
| SiGMA | <35 | 280(23) | N/A | N/A | N/A | N/A |
| SiNAA | N/A | N/A | 1400(44) | N/A | N/A | N/A |
| mPDMS 1000 | <338 | N/A | <338 | N/A | 380(256) | 2467(1057) |
| DMA | <4 | <4 | <4 | <4 | <4 | <4 |

TABLE 3-continued

Leachable Levels of Components of Formulations (ppm)

| Components | Reporting Limits | Ex. 1 | Ex. 2 | Ex. 3 | Ex. 4 | Ex. 5 |
|---|---|---|---|---|---|---|
| HEMA | <6 | <6 | <6 | <6 | <6 | <6 |
| EGDMA | <4 | <12 | <4 | N/A | N/A | N/A |
| Norbloc | <9 | N/A | 98(1) | N/A | N/A | <9 |
| Blue HEMA | <8 | N/A | <8 | N/A | N/A | <8 |
| PVP K90 | <144 | 570(94) | <144 | 2600(141) | 2500(102) | 785(178) |
| CGI 819 | <4 | <3 | 48(1) | <2 | <4 | <2 |
| maPDMS | N/A | N/A | N/A | 65(39) | 160(106) | 658(274) |
| t-Amyl Alcohol | <102 | <102 | <102 | <29 | <29 | <10 |
| OD Response (%) | N/A | 100 | 88% | 0 | 0 | 0 |

N/A designates Not Applicable.

Examples 6-8

ACUVUE ADVANCE® with HYDRACLEAR™ brand contact lenses were removed from their packages, and equilibrated in 70/30 IPA/water mixture by rolling in jars of 70/30 IPA/water mixture (1 lens/4 mLs) for 30(±5) minutes. All liquid was drained and replaced with a SiGMA spiked solution (1 lens/4 mLs) as shown in Table 4 and the lenses rolled. After 60(±10) minutes, the spiked solution was drained and DI water was added to the lenses. The lenses were rolled in DI water for 30(±5) minutes. Lenses were then inspected in DI water, packaged in vials of borate buffered saline, and sterilized at 120° C. for about 20 minutes. The lenses were analyzed for leachable SiGMA and SiGMA glycol and clinically evaluated for ocular discomfort (OD). The results are shown in Table 4, below. Standard deviations are shown in parenthesis.

TABLE 4

| Example # | [SiGMA soln] (mg/mL) | Leachable SiGMA (ppm) | Leachable Glycol (ppm) | OD (%) |
|---|---|---|---|---|
| 6 | 0 | 25.8 (1.0) | 19.6 (2.4) | 0 |
| 7 | 0.05 | 233.8 (23.2) | 23.2 (0.2) | 0 |
| 8 | 0.10 | 416.0 (24.6) | 24.6 (1.1) | 11 |

Examples 9-11

Examples 6-8 were repeated, except that the ACUVUE ADVANCE® with HYDRACLEAR™ brand contact lenses were treated with SiGMA glycol solutions of the concentrations shown in Table 5, below. The lenses were analyzed for leachable SiGMA and SiGMA glycol and clinically evaluated for ocular discomfort (OD). The results are shown in Table 5, below.

TABLE 5

| Ex. # | [SiGMA glycol soln] (mg/mL) | Leachable SiGMA (ppm) | Leachable Glycol (ppm) | OD (%) |
|---|---|---|---|---|
| 9 | 0 | 25.8 (1.0) | 19.6 (2.4) | 0 |
| 10 | 0.045 | 25.7 (0.4) | 62.4 (31.2) | NM |
| 11 | 0.090 | 25.5 (2.1) | 137.6 (7.9) | 23 |

NM = not measured

Examples 12-14

Examples 6-8 were repeated, except that the ACUVUE ADVANCE® with HYDRACLEAR™ brand contact lenses were treated with BHT solutions of the concentrations shown in Table 6, below. The lenses were analyzed for leachable BHT, SiGMA and SiGMA glycol and clinically evaluated for ocular discomfort (OD). The results are shown in Table 6, below.

TABLE 6

Leachable BHT in BHT Spiked Lenses

| Ex. # | [BHT soln] (mg/mL) | Leachable SGiMA (ppm) | Leachable Glycol (ppm) | Leachable BHT (ppm) | OD (%) |
|---|---|---|---|---|---|
| 12 | 0 | <35 | 28 (3) | 2 (0.2) | 0 |
| 13 | 0.108 | <35 | 27 (2) | 1910 (60) | NM |
| 14 | 0.270 | <35 | 28 (1) | 3180 (230) | 71 |

Examples 13-35

HPLC retention times were measured for the compounds shown in Table 8 as follows. An Agilent 1100 HPLC with a Thermo ODS Hypersil column of dimensions 150×4.6 mm×5µ, with attached Finnigan LCQ Classic mass spectrometer with electrospray ionization in tandem with UV and ELSD (Sedex) was used. Samples were prepared by making 2% (wt/wt) solutions of each test material in IPA. A 3 µL of sample solution was injected, using a flow rate of 1 ml/minute. The eluting solvent for each sample was varied using the gradient program shown in Table 7. The retention time is the time from injection to the time of the peak of elution of each sample as determined by UV absorption or electron spectrometry.

TABLE 7

| Time (min) | % acetonitrile | % water | % IPA | % buffer* |
|---|---|---|---|---|
| 0 | 40 | 48 | 10 | 2 |
| 2 | 40 | 48 | 10 | 2 |
| 8 | 82 | 6 | 10 | 2 |
| 25 | 48 | 0 | 50 | 2 |
| 30 | 28 | 0 | 70 | 2 |
| 45 | 28 | 0 | 70 | 2 |
| 46 | 40 | 48 | 10 | 2 |
| 55 | 40 | 48 | 10 | 2 |

*Buffer is 1.2 g ammonium formate and 200 µl formic acid in 1 L H$_2$O.

TABLE 8

| Ex. # | Compound | RTt (min) | $RT_{TRIS}$ |
|---|---|---|---|
| 13 | SiGMA glycol | 10.34 | 0.61 |
| 14 | ac-PDMS, n = 2 | 10.43 | 0.61 |
| 16 | BHT | 10.90 | 0.64 |
| 17 | SiNAA | 10.99 | 0.65 |
| 18 | ac-PDMS, n = 3 | 11.71 | 0.69 |
| 19 | SiGMA epoxide | 12.29 | 0.72 |
| 20 | SiGMA | 12.43 | 0.73 |
| 21 | ac-PDMS, n = 4 | 13.22 | 0.78 |
| 22 | M2D10, n = 1 | 14.49 | 0.85 |
| 23 | HO-TRIS | 14.53 | 0.85 |
| 24 | PDMS epoxide, n = 2 | 15.05 | 0.88 |
| 25 | ac-PDMS, n = 5 | 15.06 | 0.88 |
| 26 | HO-mPDMS, n = 2 | 15.13 | 0.89 |
| 27 | M2D10, n = 2 | 16.57 | 0.96 |
| 28 | TRIS | 17.02 | 1 |
| 29 | ac-PDMS, n = 6 | 17.03 | 1 |
| 30 | HO-mPDMS, n = 3 | 17.59 | 1.03 |
| 31 | MPDMS, n = 3 | 17.72 | 1.04 |
| 32 | PDMS epoxide, n = 3 | 17.73 | 1.04 |
| 33 | M2D10, n = 3 | 18.78 | 1.10 |
| 34 | ac-PDMS, n = 7 | 18.96 | 1.11 |
| 35 | SiNAA2 dimer | 20.19 | 1.19 |

What is claimed is:

1. A contact lens made by a process comprising
(a) curing in a mold a reaction mixture comprising at least one silicone containing component wherein said reaction mixture is substantially free from sparingly water soluble components or impurities having a retention time, relative to TRIS of less than about 0.9 to form a lens;
(b) contacting said lens and mold with an aqueous solution at a temperature less than 99° C. for less than about 1 hour; to release said lens from the mold and
(c) optionally post processing the lens, wherein said post processing, if conducted, is conducted with aqueous solutions for a time less than 6 hours.

2. The contact lens of claim 1 wherein said reaction mixture further comprises at least one hydrophilic component.

3. The contact lens of claim 2 wherein said hydrophilic component comprises at least one acrylic- or vinyl-containing monomer.

4. The contact lens of claim 2 wherein said hydrophilic component comprises at least one monomer selected from the group consisting of DMA, 2-hydroxyethyl methacrylate, glycerol methacrylate, 2-hydroxyethyl methacrylamide, N-vinyl pyrrolidone, N-vinyl-N-methyl acrylamide, polyethyleneglycol monomethacrylate, methacrylic acid, acrylic acid and combinations thereof.

5. The contact lens of claim 1 wherein said aqueous processing time is less than about 4 hours.

6. The contact lens of claim 1 wherein said aqueous processing time is less than about 2 hours.

7. The contact lens of claim 1 wherein said aqueous processing time is less than about one hour.

8. The contact lens of claim 1 wherein said component or impurity is present in an amount of less than about 3000 ppm in the reaction mixture.

9. The contact lens of claim 1 wherein said component or impurity is present in an amount of less than about 1000 ppm in the reaction mixture.

10. The contact lens of claim 1 wherein said component or impurity is present in an amount of less than about 200 ppm based upon all components in the reaction mixture.

11. The contact lens of claim 1 wherein said component or impurity is present in an amount of less than about 100 ppm based upon all components in the reaction mixture.

12. The contact lens of claim 1 wherein said component or impurity has a retention time relative to TRIS of less than about 0.8.

13. The contact lens of claim 1 wherein said at least one silicone component is selected from the group consisting of silicone containing monomers, prepolymers, macromers and mixtures thereof.

14. The contact lens of claim 1 wherein said at least one silicone component comprises at least one silicone monomer.

15. The contact lens of claim 1 wherein said reactive mixture is a substantially homogeneous mixture.

16. The contact lens of claim 1 wherein said silicone component is present in said reactive mixture in an amount between about 20 and 70 weight %.

17. The contact lens of claim 2 wherein said hydrophilic component is present in said reactive mixture in an amount up to about 50 weight %.

18. The contact lens of claim 2 wherein said hydrophilic component is present in said reactive mixture in an amount between about 5 and about 50 weight %.

19. The contact lens of claim 1 wherein said silicone component comprises at least one polymerizable functional group selected from the group consisting of acrylate, methacrylate, acrylamide, methacrylamide, N-vinyl lactam, N-vinylamide, and styryl functional groups.

20. The contact lens of claim 1 wherein said silicone component comprises at least one monofunctional silicone containing component.

21. The contact lens of claim 1 wherein said reaction mixture is free from measurable amounts of sparing water soluble components or impurities having a retention time, relative to TRIS of less than about 0.9.

22. The contact lens of claim 1 wherein said aqueous solution further comprises at least one release aid.

23. An ophthalmic lens which does not cause ocular discomfort when worn by a human formed from a process comprising the steps of
(a) curing in a mold a silicone containing reaction mixture comprising less than about 3000 ppm of any sparingly water soluble component or impurity having a retention time, relative to TRIS of less than about 0.9 minutes to form said ophthalmic lens;
b) contacting said lens and mold with an aqueous solution at a temperature less than 99° C. for less than about 1 hour; to release said lens from the mold and
(c) optionally post processing the lens, wherein said post processing, if conducted, is conducted with aqueous solutions for a time less than 6 hours.

24. A contact lens formed from a process comprising
(a) curing in a mold a reaction mixture comprising at least one silicone containing component, and at least one sparingly water soluble component or impurity having a retention time, relative to TRIS of less than about 0.9 to produce a cured contact lens having less than an ocular discomfort causing amount of said component or impurity,
(b) contacting said lens and mold with an aqueous solution at a temperature less than 99° C. for less than about 1 hour; to release said lens from the mold and
(c) optionally post processing the lens, wherein said post processing, if conducted, is conducted with aqueous solutions for a time less than 6 hours.

25. The contact lens of claim 24 wherein said reaction mixture further comprises at least one hydrophilic component.

26. The contact lens of claim 25 wherein said hydrophilic component comprises at least one acrylic- or vinyl-containing monomer.

27. The contact lens of claim 25 wherein said hydrophilic component comprises at least one monomer selected from the group consisting of DMA, 2-hydroxyethyl methacrylate, glycerol methacrylate, 2-hydroxyethyl methacrylamide, N-vinyl pyrrolidone, N-vinyl-N-methyl acrylamide, polyethyleneglycol monomethacrylate, methacrylic acid, acrylic acid and combinations thereof.

28. The contact lens of claim 24 wherein said aqueous processing time is less than about 4 hours.

29. The contact lens of claim 24 wherein said aqueous processing time is less than about 2 hours.

30. The contact lens of claim 24 wherein said aqueous processing time is less than about one hour.

31. The contact lens of claim 24 wherein said at least one sparingly water soluble component or impurity is present in said lens after step b, in an amount less than about 2000 ppm based upon weight of said lens in a fully hydrated state.

32. The contact lens of claim 24 wherein said aqueous solution further comprises at least one release aid.

33. The contact lens of claim 24 wherein said sparingly water soluble component or impurity is present in said lens after step b, in an amount of less than about 1000 ppm based upon weight of said lens in a fully hydrated state.

34. The contact lens of claim 24 wherein said sparingly water soluble component or impurity is present in said lens after step b, in an amount of less than about 200 ppm based upon weight of said lens in a fully hydrated state.

35. The contact lens of claim 24 wherein said sparingly water soluble component or impurity is present in said lens after step b in an amount of less than about 100 ppm based upon weight of said lens in a fully hydrated state.

36. The contact lens of claim 24 wherein said component or impurity has a retention time relative to TRIS of less than about 0.8.

37. The contact lens of claim 24 wherein said at least one silicone component is selected from the group consisting of silicone containing monomers, prepolymers, macromers and mixtures thereof.

38. The contact lens of claim 24 wherein said at least one silicone component comprises at least one silicone monomer.

39. The contact lens of claim 24 wherein said reactive mixture is a substantially homogeneous mixture.

40. The contact lens of claim 24 wherein said silicone component is present in said reactive mixture in an amount between about 20 and 70 weight %.

41. The contact lens of claim 25 wherein said hydrophilic component is present in said reactive mixture in an amount up to about 50 weight %.

42. The contact lens of claim 25 wherein said hydrophilic component is present in said reactive mixture in an amount between about 5 and about 50 weight %.

43. The contact lens of claim 24 wherein said silicone component comprises at least one polymerizable functional group selected from the group consisting of acrylate, methacrylate, acrylamide, methacrylamide, N-vinyl lactam, N-vinylamide, and styryl functional groups.

44. The contact lens of claim 24 wherein said silicone component comprises at least one monofunctional silicone containing component.

45. A lens formed from a process comprising
  (a) curing in a mold a silicone containing reaction mixture wherein all reaction mixture components and impurities which are sparingly water soluble have a retention time, relative to TRIS of at least about 1 to form a lens;
  (b) contacting said lens and mold with an aqueous solution at a temperature less than 99° C. for less than about 1 hour; to release said lens from the mold and
  (c) optionally post processing the lens, wherein said post processing, if conducted, is conducted with aqueous solutions for a time less than 6 hours.

\* \* \* \* \*